United States Patent [19]

Matsushita

[11] Patent Number: 4,751,844
[45] Date of Patent: Jun. 21, 1988

[54] ADJUSTABLE CONSTANT TEMPERATURE AND HUMIDITY CONTROL DEVICE FOR SELF-PROPELLED VEHICLES

[75] Inventor: Kyozo Matsushita, Tokyo, Japan

[73] Assignee: Kabushiki-Kaisha Toyo Seisakusho, Tokyo, Japan

[21] Appl. No.: 23,454

[22] Filed: Mar. 9, 1987

[30] Foreign Application Priority Data

Feb. 3, 1987 [JP] Japan .................. 87-047325

[51] Int. Cl.⁴ ............................ G01M 9/00
[52] U.S. Cl. ................................... 73/147
[58] Field of Search ............................ 73/147

[56] References Cited

U.S. PATENT DOCUMENTS 3,111,843  11/1963  Fredette .................. 73/147
4,073,188   2/1978  Slezinger et al. ......... 73/147

*Primary Examiner*—Donald O. Woodiel
*Attorney, Agent, or Firm*—Frishauf, Holtz, Goodman & Woodward

[57] ABSTRACT

An adjustable constant temperature and humidity control device for self-propelled vehicles is disclosed. According to the invention, the control device includes a duct system providing a circulating air channel for conducting the air contained in the testing chamber out of the testing chamber and again conducting the air into the chamber. The duct has arranged therein an air blower, a humidifier and an air conditioning unit adapted for performing a sensible heat exchange operation. The device also includes a dehumidifier mounted outside of the testing chamber and designed for introducing the air from the testing chambers as to free the air of its water contents and return the dehumidified air into the chamber and a supply pipe for supplying a thermal medium from a reservoir by a pump into the air conditioning unit, wherein the thermal medium has been supplied from a refrigerater into said reservoir as cold water. The device also includes in addition a return pipe for returning the thermal medium from the air conditioning unit back into the reservoir and a heating unit provided in the supply pipe.

6 Claims, 1 Drawing Sheet

ADJUSTABLE CONSTANT TEMPERATURE AND HUMIDITY CONTROL DEVICE FOR SELF-PROPELLED VEHICLES

BACKGROUND OF THE INVENTION

1. Field of the Invention

This invention relates to a device for controlling the temperature and the humidity of an environmental testing chamber in which to conduct various tests on a self-propelled vehicle, such as an automobile.

2. Description of the Prior Art

As one of performance test itmes for a self-propelled vehicle, such as an automobile, a series of tests are conducted on the vehicle under assumed constant temperature and humidity air conditions.

The air or wind supplied into the testing chamber of this testing device has an extremely low latent heat load, although it has a larger air or wind volume or capacity and a significant sensible heat load.

In the conventional devices, excess cooling and reheating are required for eliminating the latent heat load under conditions of the higher temperature and lower humidity, while a larger cross-sectional area of the wind channel of the air conditioning unit is used for lowering the wind velocity and thereby preventing splashing of condensed water.

Thus the conventional device is formed by a large-sized air conditioning unit and an amount of the thermal medium that is several times that corresponding to the actual load operation.

In addition, fluctuations are caused in the outlet air temperature of the air conditioning unit of the conventional control device with concomitant temperature fluctuations on the overall operating area of the air conditining unit of the conventional control device due to changes in the thermal medium in the course of the temperature control operation.

In addition, since the control device of the type described above has a wind tunnel system, temperature fluctuations will occur at the air diffuser opening or supply opening as a direct consequence of the temperature fluctuations at the outlet of the air conditioning unit, thus interfering with various tests to be conducted on the self-propelled vehicles.

SUMMARY OF THE INVENTION

It is therefore a principal object of the present invention to provide an adjustable constant temperature and humidity control device for a self-propelled vehicle wherein it is not up to the air conditioning unit to control both the temperaturte and the humidity but the humidity is controlled by eliminating the latent heat load by a dehumidifier separate from the air conditioning unit, such that the air conditioning unit is required to make only the temperature control and hence to eliminate the sensible heat load.

It is another object of the present invention to provide such control unit in which the water contents in the air are not condensed in the air conditioning unit so that the cross-sectional area of the wind channel or the wind channel area in the unit may be reduced for increasing the wind velocity through said channel.

It is another object of the present invention to provide such control device wherein the overall size of the device may be reduced since it is not necessary to use an amount of a thermal medium several times that corresponding to the actual load operation while the wind speed may be reduced as described above.

It is a further object of the present invention to provide such control device wherein the amount of the water used as the thermal medium is held at a constant value corresponding to that for a maximum load operation such that the air diffused from the unit remains constant in temperature throughout the unit to provide for improved properties of the wind channel.

In view of these objects, the adjutable constant temperature and humidity control device of the present invention includes a circulation type wind tunnel comprised of a testing chamber, an air conditioning unit, an air blower and a wind duct, and a dehumidifier provided outside of this circulation type wind tunnel. This dehumidifier imbibes air in the testing chamber to free the air of its water contents before it is again supplied into the testing chamber. The flow rate of water used as the thermal medium supplied into the air conditioning unit is held at a constant value corresponding to that for a maximum load operation of the air conditioning unit, while the temperature of the water used as the thermal medium is controlled by both the cooling unit and the heater.

BRIEF DESCRIPTION OF THE DRAWINGS

The sole FIGURE is a diagrammatic view showing an embodiment of the constant temperature and humidity control device for an environmental testing chamber for a self-propelled vehicle according to the present invention.

DESCRIPTION OF THE PREFERRED EMBODIMENTS

Figure 1:
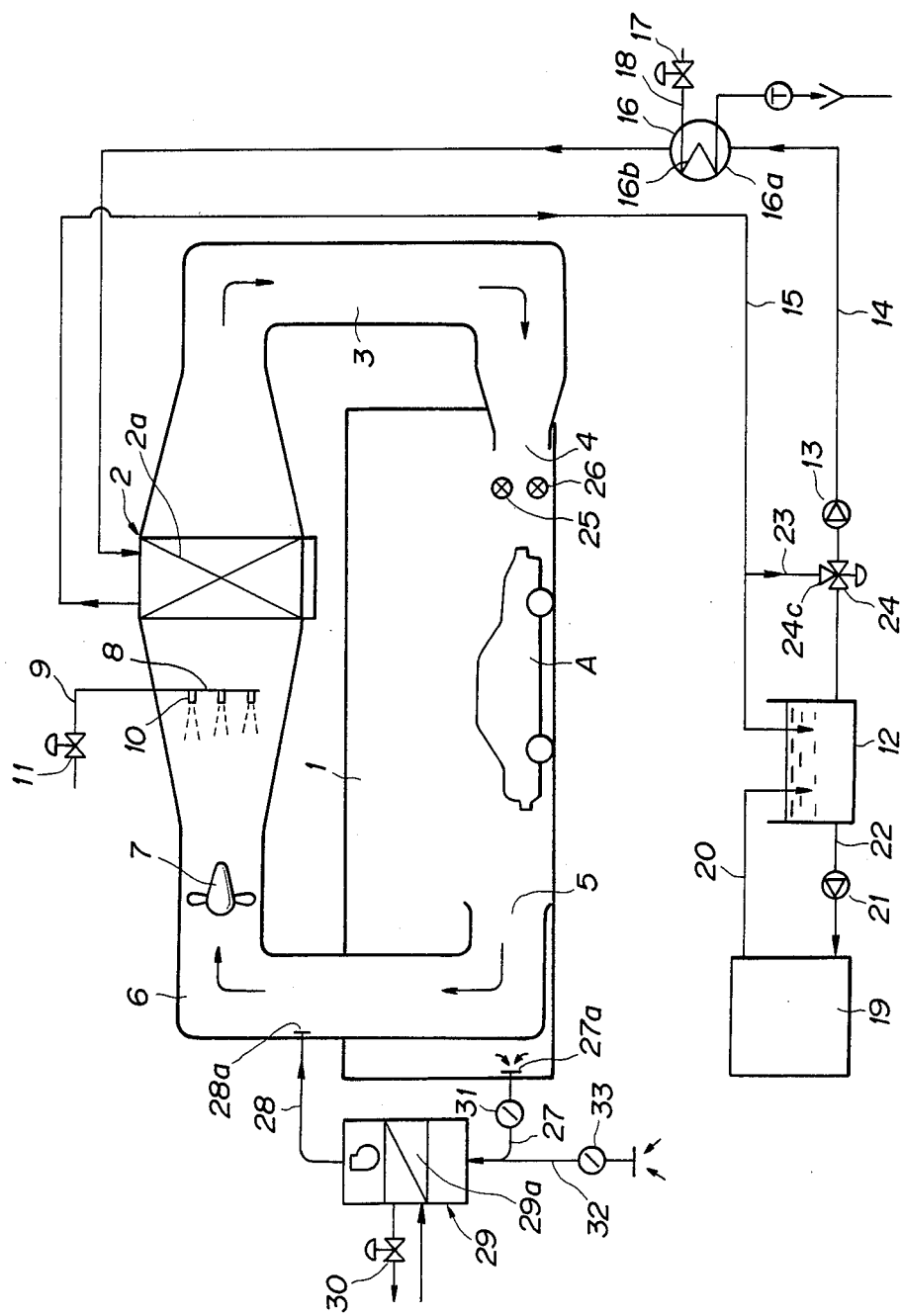

In the drawing, the numeral 1 denotes a testing chamber within which various tests or experiments are conducted on a self-propelled vehicle, such as an automobile A.

The air is supplied into the chamber 1 by way of a supply opening 4 of an air supply duct 3 from an air conditioning unit 2 installed outside the chamber. The air in the chamber 1 is introduced by an air blower 7 through a suction opening 5 of a return air duct 6 so as to be returned into said air conditioning unit to be conditioned in temperature therein before it is supplied again through the air supply duct 3.

A humidifier 8 having a number of nozzles 10 for spraying the water or vapor supplied through a piping 9 is provided in the air return duct 6. The amount of the air or vapor sprayed by these nozzles is adjusted by the opening degree of a flow adjustment valve 11 actuated by command signals from a humidity sensor 26 provided within the testing chamber.

The air conditioning unit 2 is provided with a coil 2a through which the warm water or hot water is supplied so as to be used as the thermal medium.

Thus the thermal medium stored in a reservoir 12 is supplied by a pump 13 into the coil 2a of the air conditioning unit 2 through a liquid supply pipe 14 and, after having been circulated through the coil 2a, is returned through a liquid return pipe 15 into the reservoir.

A heater 16 is provided in the liquid supply duct 14 and comprised of a heating coil 16b within a shell or enclosure 16a. When heating the air in the air conditioning unit 2, the cold water in the reservoir is heated by heat exchange with the vapor supplied to the heating coil 16b. The vapor may be adjusted in temperature by adjusting the opening degree of a flow adjustment valve 17 provided in a vapor supply pipe 18 to the coil 16b.

The water chilled by a refrigerator 19 is supplied to the reservoir 12 by way of a pipe 20. The cold water in the reservoir 12 is returned from the pipe 22 into the refrigerator by a pump 21 so as to be re-chilled there before it is returned into the reservoir 12.

A bypass pipe 23 is provided between the liquid return pipe 15 from the air conditioning unit 15 and the liquid supply pipe 14 at the suction side of the pump 13. A three-way valve 24 is provided at the point of intersection of the bypass pipe with the liquid supply pipe 14.

When supplying cold water to the air conditioning unit 2, the three-way valve 24 has its bypass side port 24c closed for closing the bypass route. However, when supplying warm water into the air conditioning unit 2, the bypass route is opened, with the opening degree of the port 24c being additionally controlled by the output signals from a temperature sensor 25 provided in the testing chamber.

This, in case of an excessively high temperature of the warm water supplied into the air conditioning unit 2, the opening degree of the bypass side port 24c is reduced by output signals from the temperature sensor 25 provided in the testing chamber so that a part of the warm water returned from the air conditioning unit is returned into the reservoir 12.

The opening degree of a flow adjustment valve 17 associated with the heater 16 may also be adjusted by command signals from the temperature sensor 25.

The water contents in the air in the testing chamber 1 may be adjusted by a dehumidifier 29 provided outside the testing chamber 1.

An air suction pipe 27 of the dehumidifer 29 has its suction port 27a opened into the testing chamber. The water contents in the air introduced through the suction port 27a are removed on condensation in a coil 29a circulated by the cold water. The dehumidified air is supplied through an outlet of an air supply pipe 28 into the testing chamber or into the air return duct 6.

The amount of moisture removal may be adjusted by adjusting the amount of the cold water supplied into the coil by a flow control valve 30.

It is noted that the dehumidifier 29 is designed so that outside air may also be imbibed therein by way of an air suction pipe 32. These suction pipes 32 and 27 are provided with dumpers 33, 31, respectively.

The above described constant temperature and humidity control device operates as follows:

When the automobile A in the testing chamber 1 is tested under climatic conditions of higher temperature and humidity, that is, when the testing chamber 1 is used as a so-called hot wind tunnel, the cold water from the reservoir 12 is heated in the heater 16 and the thus heated warm water is supplied to the coil 2a of the air conditioning unit 2 for heating the air. The warm water from the air conditioning unit 2 is conveyed by way of the liquid return pipe 15 through the three-way valve 24 of the bypass pipe 23 and the liquid supply pipe 14 back again into the coil 2a of the air conditioning unit 2. In case of an excessively high temperature of the warm water supplied into the air conditioning unit 2, the opening degree of the bypass side port 24c of the three-way valve 24 is throttled so that part of the return warm water from the unit 2 is returned into the reservoir, the cold water from the reservoir and the warm water from the bypass pipe 23 being mixed in the three-way valve 24 so as to be supplied to the air conditioning unit 2 after temperature adjustment in the heater 16.

Conversely, in case of an excessively low temperature of the warm water supplied into the air conditioning unit 2, the three-way valve is opened completely or nearly completely for adjusting the water temperature.

The air in the chamber is adjusted in humidity by the dehumidifier 29 and the humidifier 8.

Thus the air in the testing chamber is freed of its latent heat and simultaneously dehumidified and the thus dehumidified air is again humidified by the humidifier 8 for providing the air of a prescribed humidity.

In this manner, the circulated air is freed of its latent heat in the dehumidifier, such that the air conditioning unit is only required to free the sensible heat of the circulated air.

Thus the air conditioning unit may be of a limited size and the air duct of a correspondingly reduced cross-sectional area may be used, resulting in reduced costs of the overall device.

In case of a cooling operation, the bypass side port 24c of the three-way valve is closed, while the vapor is not supplied to the heater 16.

In this manner, the cold water from the reservoir 12 is directly supplied to the air conditioning unit, while the cold water from the air conditioning unit is returned into the reservoir so as to be cooled by the cold water from the referigerator. The operational sequence described above is performed repeatedly.

During this time, the air conditioning unit simply operates in sensible heat exchange relation with the return air from the air return duct.

What is claimed is:

1. An adjustable constant temperature and humidity control device for an environmental testing chamber for a self-propelled vehicle, comprising
    a duct system providing a circulating air channel for conducting the air contained in the testing chamber out of the testing chamber and again conducting the air into the chamber, said duct having arranged therein an air blower, a humidifier and an air conditioning unit adapted for performing a sensible heat exchange operation;
    a dehumidifier mounted outside of said testing chamber and designed for imbibing the air from the testing chamber so as to free the air of its water contents to then return the dehumidified air into the chamber;
    a supply pipe for supplying a thermal medium from a reservoir by a pump into said air conditioning unit, said thermal medium having been supplied from a refrigerator into said reservoir as cold water;
    a return pipe for returning said thermal medium from said air conditioning unit back into said reservoir; and
    a heating unit provided in said supply pipe.

2. An adjustable constant temperature and humidity control device as claimed in claim 1 wherein the heater is formed by a coil mounted in a shell and adapted to be supplied with vapor, and wherein the amount of vapor supplied into said coil is controlled by an adjustment valve having its opening degree adjusted by a temperature sensor mounted within said testing chamber.

3. An adjustable constant temperature and humidity control device as claimed in claim 1 wherein said return pipe from said air conditioning unit is connected by a bypass pipe to said supply pipe to said unit at the primary side of said pump, and wherein a three-way valve is provided at a point of intersection of said bypass pipe with said supply pipe, said three-way valve being so operated in dependence upon output signals from a temperature sensor provided in said testing chamber that an inlet port at the bypass side is completely opened when the temperature in said testing chamber is lower than a preset temperature and has its opening degree reduced when said temperature is higher than said preset temperature.

4. An adjustable constant temperature and humidity control device as claimed in claim 1 wherein said dehumidifier is controlled by command signals from a humidity sensor provided in said testing chamber.

5. An adjustable constant temperature and humidity control device as claimed in claim 1 wherein said humidifier is controlled by command signals from said humidity sensor provided in said testing chamber according to claim 4.

6. An adjustable constant temperature and humidity control device as claimed in claim 1 wherein the flow rate of said thermal medium supplied to said air conditioning unit is set to a constant value corresponding to that for the maximum load operation of said air conditioning unit.

* * * * *